Aug. 30, 1955

R. C. HUGHES ET AL 2,716,716

CATHODE CONTAINING A SUPPLY OF
AN ELECTRON-EMISSIVE MATERIAL

Filed Nov. 29, 1951

INVENTORS.
RAY C. HUGHES.
PATRICK P. COPPOLA
BY
Fred M Vogel
AGENT.

United States Patent Office 2,716,716
Patented Aug. 30, 1955

2,716,716

CATHODE CONTAINING A SUPPLY OF AN ELECTRON-EMISSIVE MATERIAL

Ray C. Hughes, Ardsley, and Patrick P. Coppola, Irvington-on-Hudson, N. Y., assignors, by mesne assignments, to North American Philips Company, Inc., New York, N. Y., a corporation of Delaware Application November 29, 1951, Serial No. 258,891

7 Claims. (Cl. 313—346)

Our invention relates to a cathode of the dispenser type containing a supply of electron-emissive material, particularly, heat decomposable alkaline earth compounds.

A cathode of the dispenser type is described in United States Patent 2,543,728 in which a supply of alkaline earth compounds is contained in an internal cavity of a tightly closed body of refractory metal, one wall of which is porous to the electron-emissive material contained in the cavity permitting the outer surface of the cathode to be supplied with emissive material. The alkaline-earth compounds disclosed in the patent are barium and strontium carbonates which are decomposed by heat to form the corresponding oxides.

It is the main object of this invention to provide a cathode structure which has improved electron emissive properties.

It is another object of this invention to provide a cathode of the dispenser type in which a greater portion of the electron-emissive material is released to the emitting surface of the cathode.

It is a still further object of this injection to provide a cathode of novel structure and composition in which undesirable reactions between the electron-emissive material and the material of the structure surrounding the electron-emissive material is avoided.

It is yet another object of this invention to provide a cathode structure in which the electron-emissive material is in intimate contact with the body of the cathode structure.

It is a further object of our invention to provide a cathode having a controlled rate of evaporation of the electron-emissive material.

These and further objects of the invention will appear as the specification progresses.

In a cathode of type described in United States Patent 2,543,728, the barium and strontium carbonates are decomposed by heat to form the corresponding oxides with the liberation of carbon dioxide. The barium and strontium oxides are then reduced by the action of the refractory metal surrounding the cavity, for example tungsten, to form the free metals which migrate through the pores in the porous wall portion surrounding the cavity to the exterior surface of the cathode structure. The conversion of the barium and strontium carbonates to the oxides is effected in the initial processing of the cathode. The reduction of the oxides, however, to the free metals proceeds slowly throughout the life of the cathode and the porosity of the wall is such that a monomolecular layer of barium and strontium is formed continuously on the exterior surface of the cathode.

In reducing the barium and strontium oxides, the tungsten or other refractory metal such as molybdenum, hafnium, tantalum, or niobium takes an active part and is oxidized, the process being irreversible under the particular process conditions so that as the alkaline earth material is used up, the surrounding refractory metal of the cathode body is oxidized and further deoxidation of the emissive material takes place only in the interior of the porous wall portion.

Attempts have been made to embed the electron emissive material in the heat-refractory metal either by surrounding a pellet of barium and strontium carbonates with a body of sintered tungsten or by mixing the powdered heat refractory metal with powdered barium and strontium carbonates and sintering the mixture to form a cathode body in which the electron emissive material is homogeneously distributed throughout the body of heat refractory metal.

In the case of the former, successful cathodes have been made but great care must be taken in the manufacture of such cathodes in order that satisfactory emission is thereafter obtained. The method of manufacturing a cathode in which the pellet of electron-emissive material is surrounded by a body of heat refractory metal has been described in a co-pending application Serial No. 216,972, filed March 22, 1951 by Otto G. Koppius.

All attempts to manufacture cathodes of the type in which the barium and strontium carbonates are intimately dispersed in the refractory metal have been unsuccessful.

An extensive study of the mechanism underlying the operation of the cathode has led to the discovery that undesirable reactions occur between the alkaline earth carbonates and the refractory metal during the initial processing and attempt to activate the cathode, resulting in exhausting the supply of alkaline earth compound or refractory metal. This reaction occurs at a temperature lower than that required for the thermal disassociation of the carbonates to oxides, thus preventing the eventual formation of alkaline earth oxide. Exhaustive tests have shown that what takes place in the reaction is that barium and strontium tungstates are formed when the barium and strontium carbonates are contained in the cavity or are in pellet form surrounded by the heat refractory metal and in the case of the intimately mixed powders, total conversion to a tungstate or molybdate or a similar compound for the other heat refractory metals occurs without the formation of any significant proportion of the alkaline earth oxides.

The reaction mechanism in the case of barium is probably:

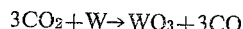

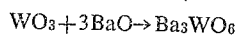

The net result of the above reaction is:

$$3BaCO_3 + W \rightarrow Ba_3WO_6 + 3CO$$

These reactions have been conclusively established by exhaustive quantitative, spectrographic and X-ray diffraction measurements and indicate that the barium is bound to the tungsten instead of being released to the exterior surface of the cathode. The tungstate, molybdate or other similar compound of barium or other alkaline earth is incapable of reacting further to yield free barium or other alkaline earth metal.

When barium oxide and tungsten (or other alkaline earth oxide and a refractory metal) are brought into contact and heated in the absence of any other oxidizing substance, then there is a reaction whereby free alkaline earth metal is formed by the reducing action of the refractory metal on the alkaline earth oxide which in the case of barium is:

The alkaline earth oxides, for example BaO, CaO, SrO, however, are not stable as such on exposure to air since they unite readily with slight traces of water vapor in the atmosphere to form the corresponding hydroxides and with like traces of $CO_2$ in the atmosphere to form the corresponding carbonates. Accordingly, it is practically impossible to manufacture a cathode using an alkaline earth oxide or mixture alkaline-earth oxides as the primary emissive material because of their affinity for water vapor and carbon dioxide.

Our invention is based upon the foregoing discovery of the undesired reactions underlying the operation of a cathode of the type utilizing a porous wall structure of heat refractory metal surrounding an alkaline earth compound which furnishes the electron emissive material to exterior surface of the cathode.

Broadly, our invention relates to a cathode of the dispenser type comprising a body of refractory metal having a porous portion. The alkaline earth compounds are specially selected to be capable of being thermally converted to oxides or other compounds or mixtures furnishing alkaline earth oxides while at the same time having present no other substance capable of oxidizing the refractory metal in a manner not productive of free alkaline earth metal.

Suitable for the purposes of the invention are alkaline earth formates, mixtures of alkaline earth azides and formates or carbonates, and alkaline earth hydrides and formates or carbonates. These mixtures comprise alkaline earth compounds reactable together by heating to produce the corresponding alkaline earth oxides. A mixture of an alkaline earth azide and alkaline earth formate is preferred because it activates rapidly at temperatures not over 1000° C. and can be applied as an aqueous solution in the manufacture of an intimately mixed type of cathode, that is, the porous tungsten body can be impregnated with a solution of these materials.

The foregoing materials may be employed in a cathode of the type disclosed in the Lemmens et al. patent or be shaped in the form of a pellet and surrounded by a porous refractory metal body or they may be mixed, in the form of a powder, with the refractory metal, formed into desired shape by pressing in a die or by extrusion with the aid of a volatile inert binder and sintered into a compact structure. The cathode may have any desired shape, for example, planar, cylindrical, cup-shaped. The alkaline earth compounds, if soluble, may be introduced into the porous refractory metal body by a solution, and the solvent removed by evaporation.

The invention will now be described in detail with reference to the accompanying drawing in which.

Figure 1:
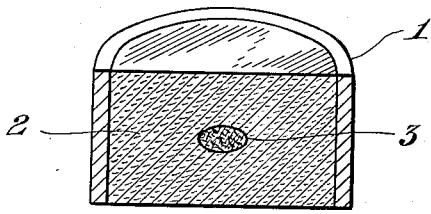
Fig. 1 is a sectionized perspective view of the cathode according to the invention.

The cathode shown in Fig. 1 comprises a retaining member 1 in the form of a tubular ring of molybdenum 1 within which there is a mass of porous sintered tungsten 2 in which a pellet 3 of electron emissive material is embedded in intimate contact with the tungsten mass. The pores in the tungsten mass are the largest apertures connecting the electron-emissive material embedded in the tungsten mass to the outside of the cathode.

Figure 2:
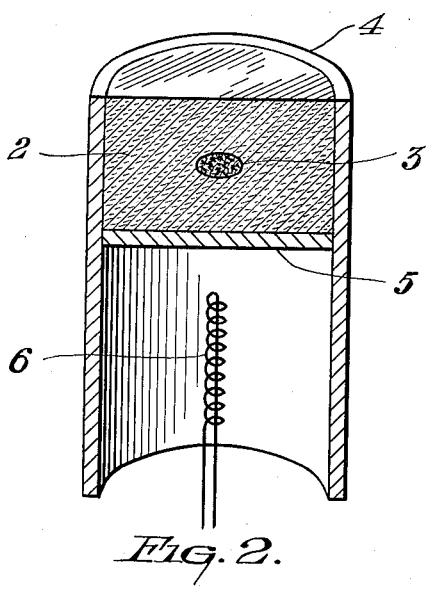
Fig. 2 is a sectionized perspective view of another embodiment of a cathode according to the invention.

Fig. 2 illustrates another form of the cathode type shown in Fig. 1 and the same parts are indicated by the same reference numerals. However, in Fig. 2, the porous sintered tungsten mass is secured to the upper cup-shaped portion of a tubular member 4 having a partition 5 which prevents emission into the lower part of the tube in which a heating filament 6 is provided.

Figure 3:
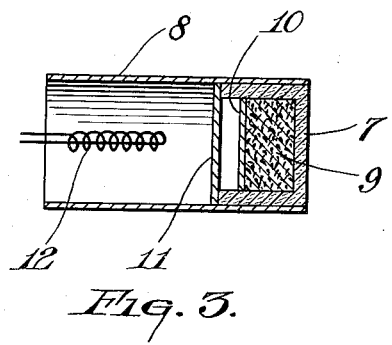
Fig. 3 is a side view in section of still another embodiment of a cathode according to the invention.

A different type of dispenser cathode is shown in Fig. 3 which comprises a cup-shaped member 7 consisting of porous sintered tungsten secured to a tube 8 consisting of a refractory metal such as molybdenum. The emissive material is contained in a cavity formed by closing the open end of the cup-shaped tungsten member with a disc 10 consisting of a refractory metal such as molybdenum which fits tightly into the cup-shaped member and is secured thereto, for example, by a welded joint formed by the passage of a condenser discharge current of such density and duration as to form a solid joint. A partition 11 of heat-refractory metal such as molybdenum separates the cup-shaped tungsten member from the rear portion of the tube in which a heater 12 is provided. The pores in the porous tungsten cup-shaped member are the largest apertures connecting the cavity containing the electron-emissive material with the outside of the cathode.

Figure 4:
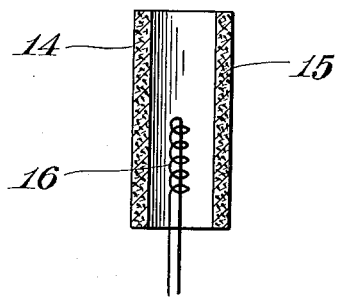
Fig. 4 is an elevational view of yet another embodiment of a cathode according to the invention.

Finally, Fig. 4 shows a tubular cylindrical cathode structure comprising a tube 14 consisting of porous sintered tungsten in which an electron-emissive material 15 is homogeneously distributed throughout the sintered tungsten mass. A heating element 16 is provided in the cylindrical cathode.

The cathodes according to the invention are capable of high emission rates and are suitable for use in magnetrons, klystrons and ultra-high frequency tubes where large currents must be drawn from the tube for short periods of time. The high current density also makes possible the manufacture of very small cathodes for other types of electron discharge tubes.

While we have thus described our invention with specific examples and embodiments thereof, other modifications will be readily apparent to those skilled in the art without departing from the spirit and scope of the invention as defined in the claims.

What is claimed is:

1. A dispenser type cathode comprising a body of sintered tungsten having a porous portion, and a supply of an electron-emissive material consisting of an alkaline earth azide and an alkaline earth formate disposed within said body, said electron-emissive material being reactable by heat to form the corresponding alkaline-earth oxide without forming products which oxidize the tungsten.

2. A dispenser type cathode comprising a body of sintered tungsten having a porous portion, and a supply of an electron-emissive material disposed within said body and comprising a mixture of an azide and a carbonate of an alkaline earth metal, said azide and carbonate being reactable by heat to form the corresponding alkaline earth oxide without forming products which oxidize the tungsten.

3. A dispenser type cathode comprising a body of sintered tungsten having a porous portion, and a supply of an electron-emissive material disposed within said body and comprising a mixture of a hydride and a formate of an alkaline earth metal, said hydride and formate being reactable by heat to form the corresponding alkaline earth oxide without forming products which oxidize the refractory metal.

4. A dispenser type cathode comprising a body of sintered tungsten having a porous portion, and a supply of an electron-emissive material disposed within said body and comprising a mixture of a hydride and a carbonate of an alkaline earth metal, said hydride and carbonate being reactable by heat to form the corresponding alkaline earth oxide without forming products which oxidize the tungsten.

5. A cathode comprising a porous body of sintered tungsten, and a supply of an electron-emissive material distributed throughout said body and comprising a mixture of an azide and a formate of an alkaline earth metal, said azide and a formate being reactable by heat to form the corresponding alkaline earth oxide without forming products which oxidize the tungsten.

6. A dispenser-type cathode comprising a body of refractory metal having a porous portion and a supply disposed within said body of an electron emissive material, said material comprising a mixture of an alkaline earth metal compound selected from the group consisting of an alkaline earth metal azide and an alkaline earth metal hydride, and another alkaline earth metal compound producing upon heating an alkaline earth oxide and an oxidizing gas, said latter compound being selected from the group consisting of alkaline earth metal formates and alkaline earth metal carbonates.

7. A dispenser-type cathode comprising a body of tungsten having a porous portion and a supply disposed within said body of an electron emissive material, said material comprising a mixture of an alkaline earth metal compound selected from the group consisting of an alkaline earth metal azide and an alkaline earth metal hydride, and another alkaline earth metal compound producing upon heating an alkaline earth oxide and an oxidizing gas, said latter compound being selected from the group consisting of alkaline earth metal formates and alkaline earth metal carbonates.

References Cited in the file of this patent

UNITED STATES PATENTS

| | | |
|---|---|---|
| 2,121,589 | Espe | June 21, 1938 |
| 2,147,447 | Kolligs | Feb. 14, 1939 |
| 2,543,728 | Lemmens | Feb. 27, 1951 |